(12) United States Patent
Park et al.

(10) Patent No.: US 10,477,599 B2
(45) Date of Patent: Nov. 12, 2019

(54) METHOD AND APPARATUS FOR MANAGING WIRELESS ROUTER AND DEVICE CONNECTED THERETO

(71) Applicant: Samsung Electronics Co., Ltd, Suwon-si (KR)

(72) Inventors: Jin Hyun Park, Suwon-si (KR); Ye Ji Yoon, Suwon-si (KR); Min Ho Kang, Suwon-si (KR); Jun Hak Lim, Suwon-si (KR); Won Tae Chae, Suwon-si (KR); Jong Mu Choi, Seongnam-si (KR); Bo Kun Choi, Seoul (KR); Doo Suk Kang, Suwon-si (KR); Sun Key Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/907,019

(22) Filed: Feb. 27, 2018

(65) Prior Publication Data

US 2018/0249517 A1    Aug. 30, 2018

(30) Foreign Application Priority Data

Feb. 27, 2017    (KR) .......................... 10-2017-0025735

(51) Int. Cl.
*H04W 76/11*    (2018.01)
*H04W 12/06*    (2009.01)
(Continued)

(52) U.S. Cl.
CPC ............ *H04W 76/11* (2018.02); *H04W 12/06* (2013.01); *H04W 12/08* (2013.01); *H04W 84/12* (2013.01); *H04W 88/08* (2013.01)

(58) Field of Classification Search
CPC . H04W 52/0229; H04W 76/11; H04W 12/06; H04W 12/08; H04W 88/08; H04W 72/0446

See application file for complete search history.

(56) References Cited

U.S. PATENT DOCUMENTS 8,494,164 B2    6/2013    Kweon et al.
9,215,643 B2    12/2015    Muto et al.
(Continued)

FOREIGN PATENT DOCUMENTS

| KR | 10-2011-0088761 A | 8/2011 |
| KR | 10-2013-0043336 A | 4/2013 |
| KR | 10-2015-0092873 A | 8/2015 |

OTHER PUBLICATIONS

ISA/KR, "International Search Report and Written Opinion of the International Searching Authority," International Application No. PCT/KR2018/002073, dated Jun. 1, 2018, 12 pages.

*Primary Examiner* — Anez C Ebrahim

(57) ABSTRACT

An electronic device includes a housing, a wireless communication circuit, a wired communication interface, a processor, and a memory. The memory stores instructions that, when executed, cause the processor to connect with an external device by using the wireless communication circuit or the wired communication interface, to receive first information to set the electronic device as an access point (AP) from the external device, to receive second information on another AP from the external device, to configure the electronic device by using the first information, and to wirelessly broadcast a signal by using the wireless communication circuit, to allow wireless devices to connect to the AP.

20 Claims, 12 Drawing Sheets

(51) Int. Cl.
*H04W 12/08* (2009.01)
*H04W 84/12* (2009.01)
*H04W 88/08* (2009.01)

(56) References Cited

U.S. PATENT DOCUMENTS

| | | |
|---|---|---|
| 10,009,838 B2 | 6/2018 | Park et al. |
| 2006/0078123 A1 | 4/2006 | Bichot et al. |
| 2010/0040022 A1* | 2/2010 | Lindstrom ........ H04W 36/0055 370/331 |
| 2010/0111055 A1 | 5/2010 | Chiu et al. |
| 2012/0243460 A1* | 9/2012 | Muto ...................... H04L 45/22 370/315 |
| 2014/0071959 A1* | 3/2014 | Ghosh ............... H04W 72/0446 370/336 |
| 2014/0086124 A1* | 3/2014 | Knowles ........... H04W 52/0277 370/311 |
| 2015/0036662 A1* | 2/2015 | Chen .................... H04W 36/08 370/332 |
| 2015/0163734 A1 | 6/2015 | Park et al. |
| 2015/0201444 A1* | 7/2015 | Kiukkonen ....... H04W 72/0406 455/450 |
| 2016/0227474 A1 | 8/2016 | McRae |
| 2016/0373270 A1 | 12/2016 | Yang et al. |

\* cited by examiner

METHOD AND APPARATUS FOR MANAGING WIRELESS ROUTER AND DEVICE CONNECTED THERETO

CROSS-REFERENCE TO RELATED APPLICATION(S)

This application is based on and claims priority under 35 U.S.C. § 119 to a Korean Patent Application No. 10-2017-0025735, filed on Feb. 27, 2017 in the Korean Intellectual Property Office, the disclosure of which is incorporated by reference herein its entirety.

TECHNICAL FIELD

The present disclosure relates to a technology for connecting various devices to a new wireless router in a situation where a wireless router to which various devices are connected is replaced.

BACKGROUND

For example, a mobile terminal provides a basic function of connecting to the Internet over a mobile communication network (a cellular network), but a function of connecting to the Internet through a wireless LAN such as wireless-fidelity (Wi-Fi) is nowadays being added to the mobile terminal. As such, in the case where the mobile terminal supports connection through the wireless LAN instead of network connection through a base station, a wireless router (or a wireless LAN router) that provides a wireless connection service is required.

The wireless router performs wireless communication with electronic devices in a state where the wireless router connects to a wired network, to perform functions of transferring a signal transmitted by a relevant electronic device to the wired network and transmitting a signal received from the wired network to a relevant communication terminal.

SUMMARY

Since an electronic device such as a desktop, a notebook, a smartphone, or the like is a device capable of directly processing an input of a user, the user may easily process various settings for connecting to the wireless router. However, most home appliances have inconvenient interfaces. For example, in a dedicated input device such as a remote controller or an image apparatus such as a television with a large-sized screen, it is inconvenient to directly input settings for connecting to the wireless router. Also, in the case of home appliances such as a refrigerator, a washing machine or Internet of things (IoT) apparatuses which are not equipped with a dedicated input device or a screen, the connection to the wireless router may require a complicated, inconvenient work.

Certain embodiments according to the present disclosure address at least the above-mentioned problems and/or disadvantages and to provide at least the advantages described below.

In accordance with certain embodiments of the present disclosure, an electronic device may include a housing; a wireless communication circuit positioned inside the housing and configured to support a wireless communication protocol with a coverage within, for example, 100 meters; a wired communication interface positioned inside the housing; a processor positioned inside the housing and operatively connected to the wireless communication circuit and the wired communication interface; and a memory positioned inside the housing and electrically connected to or integrated with the processor. The memory stores instructions that, when executed, cause the processor to connect with an external device by using the wireless communication circuit or the wired communication interface, to receive first information to set the electronic device as an access point (AP) from the external device, to receive second information on another AP from the external device, to configure the electronic device by using the first information, and to wirelessly broadcast a signal by using the wireless communication circuit, to allow wireless devices to connect to the AP. In this case, the signal may include a header; and a frame body including a service set identifier (SSID) provided based at least partly on the first information, and information provided based at least partly on the second information.

In accordance with certain embodiments of the present disclosure, an electronic device may include a housing; a wireless communication circuit positioned inside the housing and configured to support a wireless communication protocol with a coverage within 100 meters; a processor positioned inside the housing and operatively connected to the wireless communication circuit; and a memory positioned inside the housing and electrically connected to or integrated with the processor. The memory may store instructions that, when executed, cause the processor to connect wirelessly with a first access point (AP) including a first service set identifier (SSID) by using the communication circuit, to determine that wireless connection to the first AP is discontinued, to scan a broadcast signal from a second AP, wherein the signal includes a header, and a frame body including a second SSID, and information element, to determine that the information element includes the first SSID, and to connect wirelessly with the second AP with the second SSID by using the communication circuit.

In accordance with certain embodiments of the present disclosure, an electronic device may include a housing; a touchscreen display exposed through the housing; a wireless communication circuit positioned inside the housing and configured to support a wireless communication protocol with a coverage within, for example, 100 meters; a processor positioned inside the housing and operatively connected to the display and the communication circuit; and a memory positioned inside the housing and electrically connected to the processor. The memory may store instructions that, when executed, cause the processor to connect wirelessly with a first access point (AP) broadcasting a first service set identifier (SSID) by using the communication circuit, to store the first SSID in the memory, to connect wirelessly with a second AP by using the communication circuit, set up the second AP by using a second SSID that is generated automatically or is provided by a user through the display, and to provide the first SSID to the second AP for the second AP to connect to external devices previously connected to the first AP.

According to various embodiments, various shapes of devices, in particular, electronic devices not equipped with a dedicated input device or a screen may easily connect to a wireless router to use the Internet.

Also, a user may easily establish network connection of a wireless device, thereby improving convenience of the user. In addition, through an operation of a proposed wireless router, the user may minimize an error that can occur upon entering information on the wireless router to a wireless electronic device.

According to various embodiments, it may be possible to prevent an electronic device of a malicious user or an unauthenticated electronic device from connecting to a wireless router by using a server authentication method.

According to various embodiments, also, the user may register a wireless electronic device to be connected to a new wireless router with the same account as a user account by using account information entered to a wireless router and account information of a portable electronic device operated in conjunction with the wireless router.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
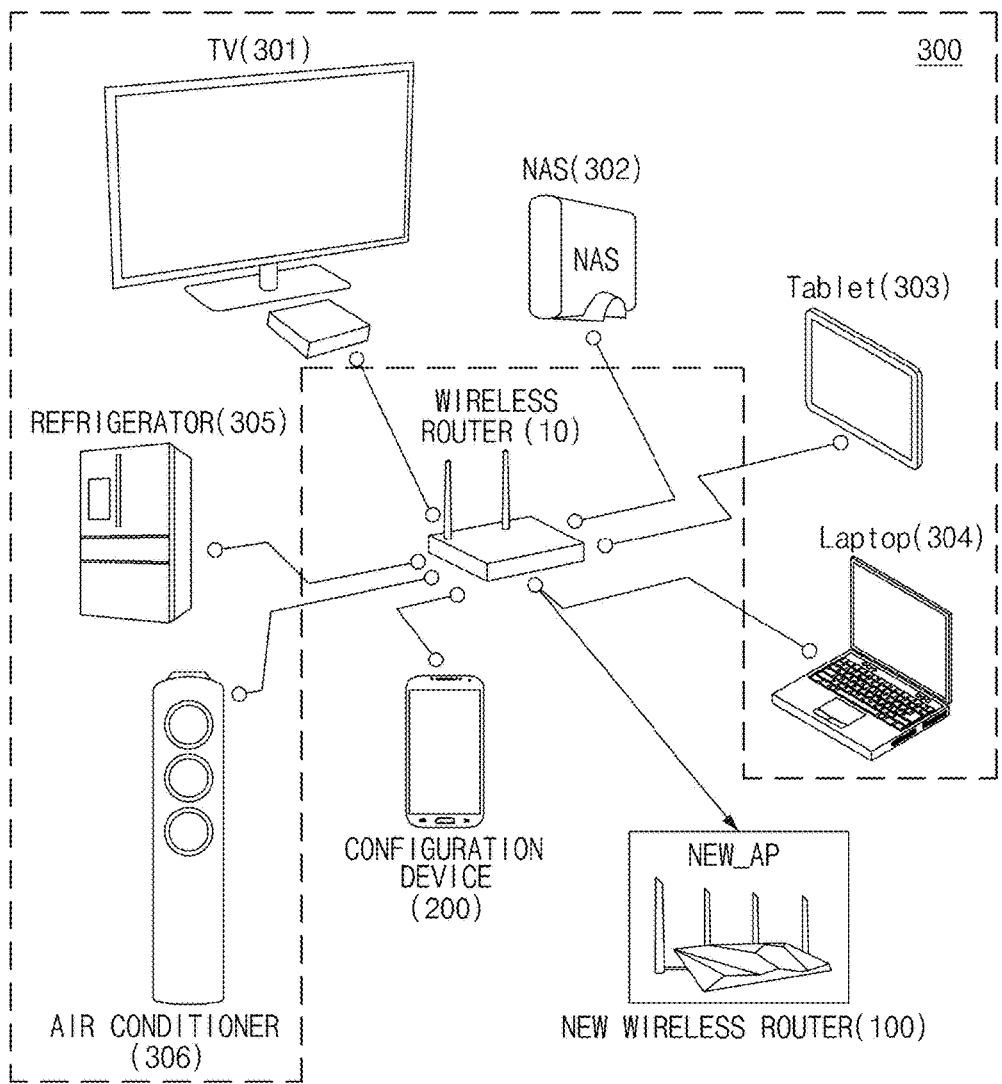
FIG. 1 illustrates an environment according to certain embodiments in which a wireless router is replaced with a new wireless router.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™) electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an environment according to certain embodiments in which a wireless router is replaced.

Referring to FIG. 1, a wireless router installed in a place such as a home or an office may be replaced with a new wireless router. For example, a first wireless router 10 that provides a wired/wireless network environment in a given place may be replaced with a second wireless router 100.

The wireless router 10 may be connected with a plurality of electronic devices such as a television (TV) 301, network attached storage 302, a tablet 303, a laptop 304, a refrigerator 305, and an air conditioner 306. In the specification, the plurality of electronic devices 301, 302, 303, 304, 305, and 306 that are used while being connected with a wireless router may be collectively referred to as a "peripheral device(s) 300". That is, in the specification, the peripheral device 300 is defined as one or more electronic devices that are connectable with a wireless router over a wireless network.

In at least one embodiment, a configuration device 200 may be a user terminal such as a smartphone. The configuration device 200 may set up the new wireless router 100 such that the peripheral device 300 that was connected with the wireless router 10 connects to the new wireless router 100 by using identification information of the wireless router 10. However, in certain embodiments, the configuration device 200 may be replaced with a specific peripheral device(s) 300. For example, the tablet 303, the laptop 304, or a personal computer (PC) (not illustrated) may set up the wireless router 100. In some embodiments, the configuration device 200 may be referred to as a "mobile terminal".

The wireless router 100, the configuration device 200, and the peripheral device 300 all may be understood as electronic devices. In some embodiments, an electronic device that connects various electronic devices to a wired device or relays communication between wireless electronic devices may be understood as the "wireless router 100". In an embodiment, the wireless router 100 may perform a function of an access point in addition to a function of a router.

According to at least one embodiment, a plurality of wireless routers may be provided. For example, a wireless router "A" may be connected with an external network, and a wireless router "B" may be wirelessly connected with the wireless router "A". This structure may be understood as connection of a backbone network—a root wireless router (e.g., the wireless router "A")—a sub wireless router (e.g., the wireless router "B")—an electronic device. That is, according to various embodiments, a wireless router may have a wired connection with a backbone network and may be wirelessly connected through another wireless router.

Also, an electronic device that performs a role of establishing a relationship between the wireless router 10 and the new wireless router 100 may be understood as the "configuration device 200". Also, an electronic device that is connectable with the new wireless router 100 by using information set by the configuration device 200 may be understood as the "peripheral device 300".

According to certain embodiments, peripheral devices 300 connected with the wireless router 10 may be connected with the wireless router 10 by using interfaces that the peripheral devices 300 provide, respectively. For example, a user may select an appropriate menu in an interface displayed in a screen of the TV 301 by using a remote controller, to search for a peripheral wireless router. When a service set identifier (SSID) corresponding to the wireless router 10 is found, the user may connect the wireless router 100 and the TV 301 to a network by selecting the found wireless router 10 and entering a connection password. In the case of an electronic device such as the tablet 303 or the laptop 304, the user may establish connection with the wireless router 10 through a user-friendly interface (e.g., a keyboard, a touchscreen, or the like). However, according to some embodiments, an electronic device such as the refrigerator 305 or the air conditioner 306, the user may set up a network through an LED display area or a small touch-screen.

For reference, the SSID can, for example, refer to identification information for identifying a wireless router to connect, like an identifier of a wireless router defined in IEEE 802.11. In the specification, for convenience, a description is given based on the SSID, but another identifier/identification information that is equal to the SSID or is able to replace the SSID may not be excluded.

According to certain embodiments, if the wireless router 10 is replaced with the new wireless router 100, the user may again set up a network between the new wireless router 100 and the peripheral devices 300. In addition to embodiments wherein an interface that the peripheral device 300 provides is inconvenient, such as, for example, the refrigerator 305, the air conditioner 306, a washing machine, or a cleaner, even in the case where an interface that the tablet 303 or the laptop 304 provides is convenient, the above-described re-setup operation is the process that can be inconvenient for the user.

According to certain embodiments, in a situation where a wireless router is replaced, if a new wireless router (e.g., the new wireless router 100) provides information of a previously used wireless router (e.g., the wireless router 10), there may be provided a method in which electronic devices that were connected to the previous wireless router easily use the new wireless router. For example, the new wireless router may broadcast an SSID including the SSID of the previous wireless router. An electronic device (e.g., the peripheral device 300) that receives the SSID of the new wireless router may perform network connection by using the SSID of the previous wireless router, which is included in the SSID of the new wireless router.

As a non-limiting example, in the case where the wireless router 10 is replaced with the new wireless router 100, the user may configure the new wireless router 100 by using the configuration device 200. The configuration device 200 may provide information of wireless router 10 to the new wireless router 100 in the process of configuring the new wireless router 100. The peripheral device 300 that was connected with the wireless router 10 may scan wireless routers including the new wireless router 100 and may attempt to connect to the new wireless router 100 that is providing the information of the wireless router 10 together.

Below, overall operations of a system will be described with reference to the non-limiting example of FIG. 2, characteristics of the wireless router 100 will be described with reference to the non-limiting examples of FIGS. 3 to 5, and characteristics of the peripheral device 300 will be described with reference to the non-limiting example of FIG. 10.

Figure 2:
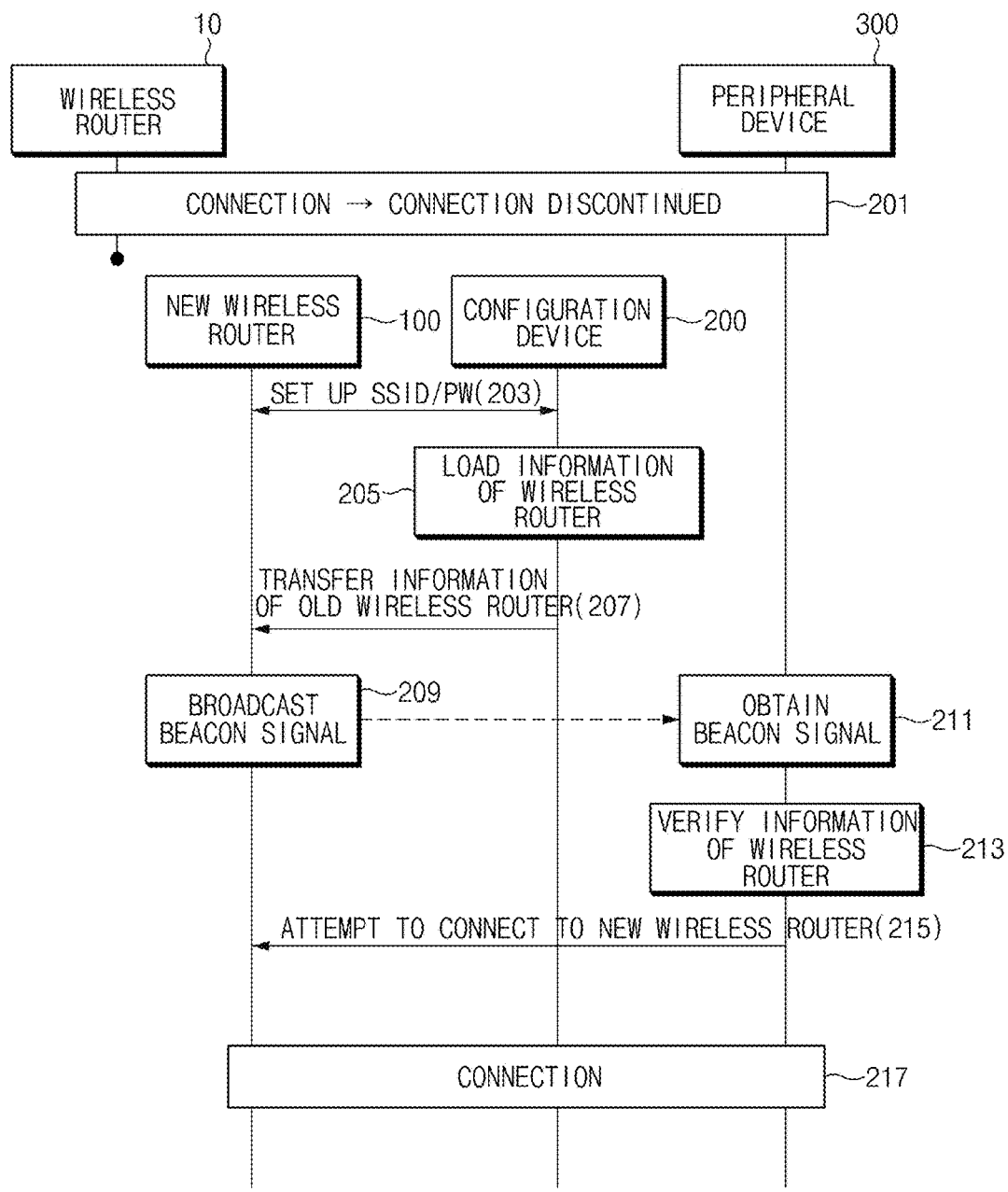
FIG. 2 illustrates a process of replacing and connecting the wireless router, according to certain embodiments.

FIG. 2 illustrates a process of replacing and connecting a wireless router, according to certain embodiments.

Referring to the non-limiting example of FIG. 2, the peripheral device 300 that has been connected with the wireless router 10 may be discontinued from the wireless router 10 in operation 201. For example, there may be a situation in which power of the wireless router 10 is off and is replaced with the new wireless router 100. In at least one embodiment, the peripheral device 300 may be a home appliance, such as a refrigerator, an air conditioner, or a washing machine. However, in other embodiments, the peripheral device 300 may be expanded to a PC, a portable terminal, an authentication server, or the like.

In some devices, to connect a peripheral device to the new wireless router 100, a user may set up an SSID and a password of the new wireless router 100 through configuring a wireless connection environment that each peripheral device 300 provides. However, according to certain embodiments of the present disclosure, other peripheral devices 300 may be easily connected with a wireless network through the procedure in which the configuration device 200 sets up the SSID/password with the new wireless router 100.

In operation 203, the configuration device 200 may set up the SSID and password of the new wireless router 100. The password may be set up or may not be set up. In some embodiments, the configuration device 200 may store an application for setting up the new wireless router 100. The user may execute the stored application and may set up the SSID and the password for the new wireless router 100. In some embodiments, for example, in the case where the application is not installed in the configuration device 200, the configuration device 200 may download an application associated with the new wireless router 100. For example, the configuration device 200 may receive beacon information from the new wireless router 100 or may detect the new wireless router 100 through wired connection (e.g., PnP), and may download an application from a web server and/or an application store/market.

In certain embodiments, the user may connect to a website for setting up the new wireless router 100 through the configuration device 200. For example, the user may enter an URL address such as 192.168.0.1, and the new wireless router 100 corresponding to the URL address may provide the user with an embedded web UI in response to a connection request.

In the non-limiting example of FIG. 2, the configuration device 200 connected with the new wireless router 100 may manage the new wireless router 100 through a separate web portal or cloud. For example, the configuration device 200 may connect to the web portal through wireless or wired connection and may manage a router(s) of the user registered at the web portal. That is, through a web portal at a remote place without directly connecting to the wireless router, the user may set up a wireless router or may monitor a state of the wireless router. However, for convenience of description, the process of setting up the new wireless router 100 based on the configuration device 200 that uses wireless communication like a mobile terminal will be described below.

According to certain embodiments, if the SSID and password of the new wireless router 100 are set up, in operation S205, the configuration device 200 may load information of the wireless router 10. Here, the information of the wireless router 10 may include at least SSID information of the wireless router 10. Additionally, the information of the wireless router 10 may include identification information of electronic devices that were connected with the wireless router 10. Besides, various information for automatizing or simplifying connection between the new wireless router 100 and the electronic device may be further included in the information of the wireless router 10. Various methods in which the configuration device 200 loads the information of the wireless router 10 will be described later.

In the non-limiting example shown in FIG. 2, at operation 207, the configuration device 200 may provide the information of the wireless router 10 to the new wireless router 100. The new wireless router 100 may broadcast a wireless signal such as a beacon signal in operation 209. At least a part of the information of the wireless router 10 may be included in the beacon signal.

According to certain embodiments, at operation 211, the peripheral device 300 may obtain the beacon signal from the new wireless router 100. The peripheral device 300 that was connected to the wireless router 10 may be in a state where the peripheral device 300 loses a wireless router to connect for connection to a network such as Internet. In this state, the peripheral device 300 may scan the new wireless router 100 through the beacon signal.

In the non-limiting example of FIG. 2, at operation 213, the peripheral device 300 may identify the new wireless router 100 as a wireless router to connect for network connection through the information of the wireless router 10 included in the beacon signal.

According to certain embodiments, at operation 215, the peripheral device 300 may attempt to connect to the new wireless router 100. If the peripheral device 300 is authenticated, the new wireless router 100 may establish connection with the peripheral device 300 and may allow the peripheral device 300 to access a network through the new wireless router 100.

In some embodiments, the new wireless router 100 may receive a request (e.g., a probe request frame) including the information (e.g., SSID) of the wireless router 10 from the peripheral device 300. The new wireless router 100 may transmit a response (e.g., a prove response frame) to the peripheral device 300 that transmits the request, in response to the received request. If the request-response procedure is completed, the new wireless router 100 may provide a wireless network service to the peripheral device 300.

Figure 3:
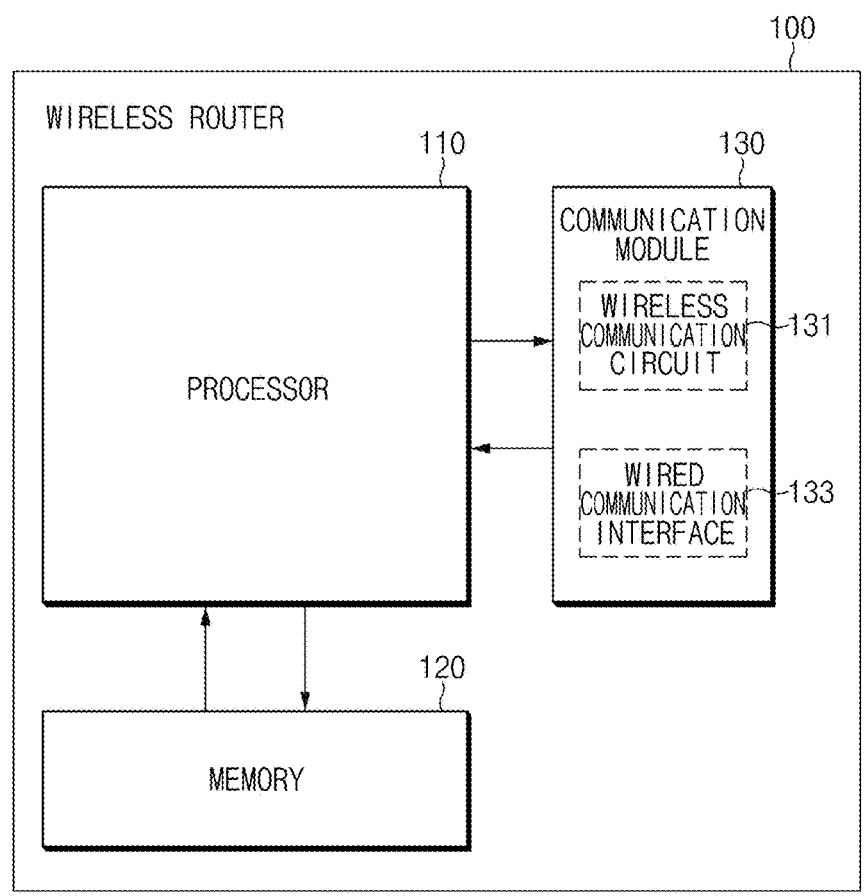
FIG. 3 illustrates components of the router according to some embodiments of this disclosure.

FIG. 3 illustrates components of a wireless router according to some embodiments of this disclosure.

Referring to the non-limiting example of FIG. 3, the wireless router 100 according to an embodiment may include a processor 110, a memory 120, and a communication module 130. The communication module 130 may include a wireless communication circuit 131 and a wired communication interface 133. The above-described components of the wireless router 100 may be positioned inside a housing.

According to certain embodiments, the wireless communication circuit 131 may be electrically connected with an antenna. The antenna may be positioned inside the housing of the wireless router 100 or may be implemented with a part of the housing. Also, the wireless communication circuit 131 may include a wireless communication chip that supports an appropriate communication protocol. The wireless communication circuit 131 may perform communication by using various communication standards including the IEEE 802.11 standard.

In the non-limiting example of FIG. 3, wireless communication circuit 131 may support at least one wireless communication protocol. For example, the wireless communication circuit 131 may support at least one wireless communication protocol of Bluetooth, Zigbee, wireless highway addressable remote transducer (WirelessHART), near field communication (NFC), Wi-Fi, Wi-Fi Direct, a communication technology (e.g., GSM, HSDPA, LTE, or LTE-A) of the GSM/3GPP family, a communication technology (e.g., CDMA or CDMA2000) of the 3GPP2 family, or a communication technology (e.g., Wibro) of the WiMax family.

The wired communication interface 133 may provide wired connection for a server or an electronic device (e.g., the configuration device 200 or the peripheral device 300) placed outside the wireless router 100. The wireless router 100 may include a plurality of slots that are exposed through the housing and are connectable with a wired communication cable. If a wired communication cable is connected to a slot, the wireless router 100 may transmit and receive data with the server or an external device through the wired communication interface 133.

According to certain embodiments, processor 110 may use various encryption methods for security of wireless communication through the communication module 130. For example, the processor 110 may encrypt a packet to be transmitted and may allow the encrypted packet to be transmitted to the outside through the communication module 130. The wireless router 100 according to an embodiment may perform authentication on an electronic device attempting connection and may provide a service only to an electronic device passing the authentication.

The processor 110 may, according to certain embodiments, use various authentication schemes for security. For example, the processor 110 may use an encryption scheme and a decryption scheme for communication of the wireless router 100 based on a security protocol called "WPA2 (Wi-Fi protected access version 2)". For reference, "WPA" is an encryption standard in which a TKIP (temporal key integrity protocol) security technology and an EAP (extensible authentication protocol) security technology are additionally applied to a conventional WEP (wired equivalent privacy) technology for the purpose of making up for security vulnerability of a conventional WEP, and "WAP2" that is an advanced encryption standard of the WPA is an encryption standard in which an AES (advanced encryption standard) encryption technology is added to the WPA technology.

In some embodiments, the processor 110 may use a WPA2-PSK scheme that allows the peripheral device 300 to connect to the wireless router 100 by using a password or the like determined in advance. In another embodiment, the processor 110 may use a WPA2-Enterprise scheme that allows the peripheral device 300 to access to a network through authentication of a server using a key for each device and/or for each user.

In certain embodiments, the processor 110 may use an MAC authentication scheme to filter an electronic device (e.g., the peripheral device 300) connectable with the wireless router 100 based on an MAC address that is uniquely allocated for each device. This may be understood as a kind of white list scheme. Unlike the above description, the processor 110 may use a black list authentication scheme that does not permit only an electronic device having a registered MAC address to connect to the wireless router 100.

According to some embodiments, instructions that are executable by the processor 110 may be stored in the memory 120. For example, instructions for executing an operation(s) or a function(s) described as being performed by the wireless router 100 or the processor 110 may be stored in the memory 120.

The description given with reference to FIG. 3 with regard to the wireless router 100 is illustrative and not intended to limit the scope of the present disclosure. Besides, a wireless router that has a configuration or an encryption/decryption scheme well known to one skilled in the art may correspond to the wireless router 100.

Figure 4:
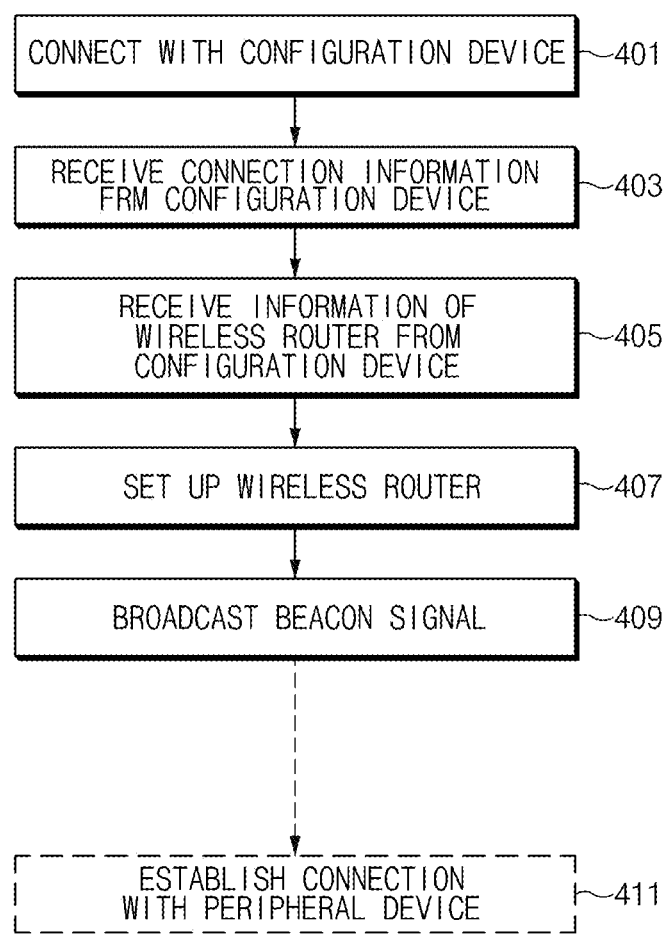
FIG. 4 illustrates, in flowchart format, operations of a method of operating the wireless router according to certain embodiments.

FIG. 4 illustrates, in flowchart format, operations of a method of operating a wireless router according to certain embodiments.

The wireless router 100 according to some embodiments may include all or a part of components shown in FIG. 3.

Referring to the non-limiting example of FIG. 4, in operation 401, the wireless router 100 may be connected with the configuration device 200. For example, the wireless router 100 may be connected with the configuration device 200 through the wireless communication circuit 131 or the wired communication interface 133.

According to certain embodiments, at operation 403, the wireless router 100 may receive communication information for setting the wireless router 100 as a wireless router from the configuration device 200 through the wireless communication circuit 131 or the wired communication interface 133. The connection information may be referred to as "first information". The connection information may include, for example, an SSID of the wireless router 100 and a password to be used for connection. The SSID of the wireless router 100 included in the connection information may be referred to as "second SSID" for the purpose of being distinguished from the SSID of the wireless router 10. The SSID of the wireless router 10 may be referred to as "first SSID".

According to certain embodiments, at operation 405, the wireless router 100 may receive information of the wireless router 10 from the configuration device 200 through the wireless communication circuit 131 or the wired communication interface 133. The information of the wireless router 10 may be referred to as "second information". The second information may include, for example, the first SSID that is the SSID of the wireless router 10.

According to certain embodiments, at operation 407, the processor 110 of the wireless router 100 may set up the wireless router 100 by using the first information. For example, the processor 110 may set up the connection information for the wireless router 100 by using the SSID and the password included in the first information. If the wireless router 100 is configured, any electronic device may access the wireless router 100 by entering the password with respect to a wireless router having the SSID.

In operation 409, the processor 110 of the wireless router 100 may allow a signal to be broadcast wirelessly through the wireless communication circuit 131 such that the peripheral device 300 connects to the wireless router 100. For example, the wireless router 100 may broadcast a beacon signal. A structure of a signal that the wireless router 100 broadcasts will be described with reference to FIG. 5.

In some embodiments, at operation 411, the wireless router 100 may establish connection with a peripheral device (e.g., the peripheral device 300 of FIG. 1). Depending on the peripheral device 300 to connect to the wireless router 100 is present around the wireless router 100, operation 411 may be performed or may not be performed. For example, in the case where the peripheral device 300 receiving the beacon signal attempts to connect to the wireless router 100 based on the first SSID included in the beacon signal, in operation 411, the wireless router 100 may establish connection with the relevant peripheral device 300.

Figure 5:
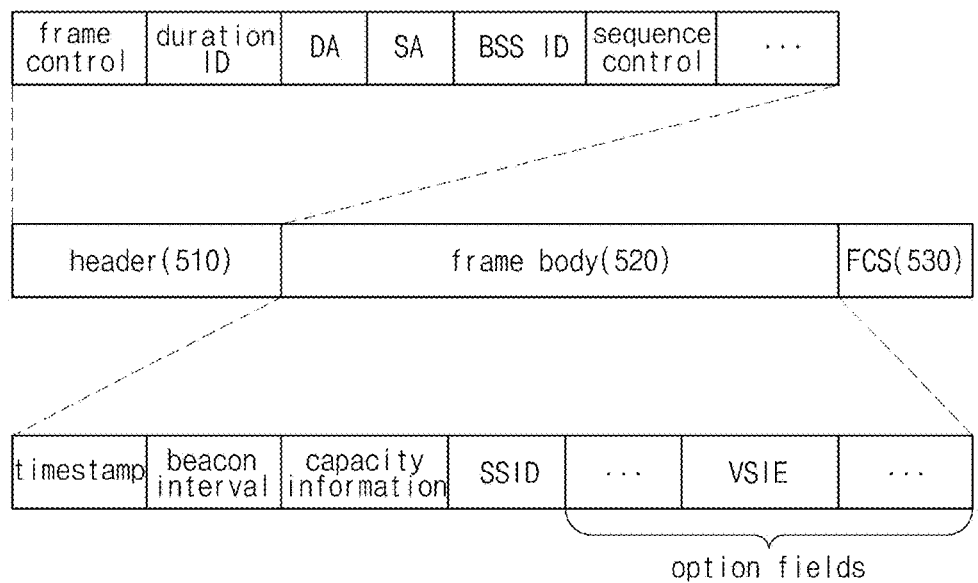
FIG. 5 illustrates one example of structure of a wireless signal which wireless routers according to certain embodiments broadcast.

FIG. 5 illustrates one example of a structure of a wireless signal which wireless routers according to certain embodiments broadcast.

In some embodiments, the wireless router 100 may broadcast a beacon frame 500 indicating the presence of a wireless network basic service set (BBS) that the wireless router 100 has control over. The beacon frame 500 may include a header 510, a frame body 520, and a frame check sequence (FCS) 530.

In certain embodiments, the header 510 may include, for example, a frame control field (2 bytes), a duration ID field (2 bytes), a destination address (DA) (6 bytes), a source address (SA) (6 bytes), a BSS ID (6 bytes), a sequence control (2 bytes), and the like.

In at least one embodiment, the frame body 520 may include a plurality of required fields and at least one option field. A required field may include, for example, a timestamp field (8 bytes), a beacon interval field (2 bytes), a capacity information field (2 bytes), and an SSID field of a variable length. For example, the second SSID that is provided based on the above-described first SSID may be included in the SSID field.

The option field may include various additional information that is not defined as a required field in the IEEE 802.11 standard or the like. For example, the option field may include information on a vendor specific information element (VSIE) defined by the protocol for Wi-Fi. The first SSID that is provided based at least partly on the above-described second information may be included in the VSIE. This may be exemplary, and the first SSID may be included in another appropriate element.

In some embodiments, the new wireless router 100 may broadcast a signal including the information on the wireless router 10 obtained from the configuration device 200 in a partial area of the beacon frame 500. For example, the wireless router 100 may transmit the signal by including information based at least partly on the information on the wireless router 10 into a VSIE area transmitted together with the SSID field for identification of a wireless router, which is present in the beacon frame 500. In an embodiment, a signal that the wireless router 100 broadcasts may include a header, and a frame body including an SSID provided based at least partly on the first information and information provided based at least partly on the second information.

In certain embodiments, in the case where a length of the SSID is long, the wireless router 100 may abbreviate the SSID to broadcast a beacon signal. For example, the wireless router 100 may limit the number of characters of the first SSID of the wireless router 10 included in the VSIE to first 12 characters. For example, in the case where the first SSID of the wireless router 10 is "MYHOMEWIRELESS1234", only "MYHOMEWIRELE" may be included in the VSIE. More generally, in the case where the number of characters of an SSID exceeds a specified length, only a partial SSID, the length of which corresponds to the specified length or is shorter than the specified length, may be included in the frame body 520.

The configuration device 200 according to certain embodiments will be described with reference to FIGS. 6 to 9. The contents common to an electronic device among the contents described with reference to FIG. 3 may also be applied to the configuration device 200 or the peripheral device 300. Accordingly, a description that is overlapped with or similar to the above description will not be repeated here. For example, an electronic device (the configuration device 200 or the peripheral device 300) may include a housing, a touchscreen display that is exposed through the housing, a wireless communication circuit that is positioned inside the housing and supports a specified wireless communication protocol, a processor that is positioned inside the housing and is operatively connected to the display and the wireless communication circuit, and a memory that is positioned inside the housing and is electrically connected with the processor. Instructions that are executable by the processor may be stored in the memory. For example, in the specification, instructions for executing an operation(s) or a function(s) described as being performed by the electronic device (the configuration device 200 or the peripheral device 300) may be stored in the memory. An exemplary configuration of the electronic device will be described with reference to FIG. 6. An electronic device 601 of FIG. 6 may be understood as an example of the configuration device 200.

Figure 6:
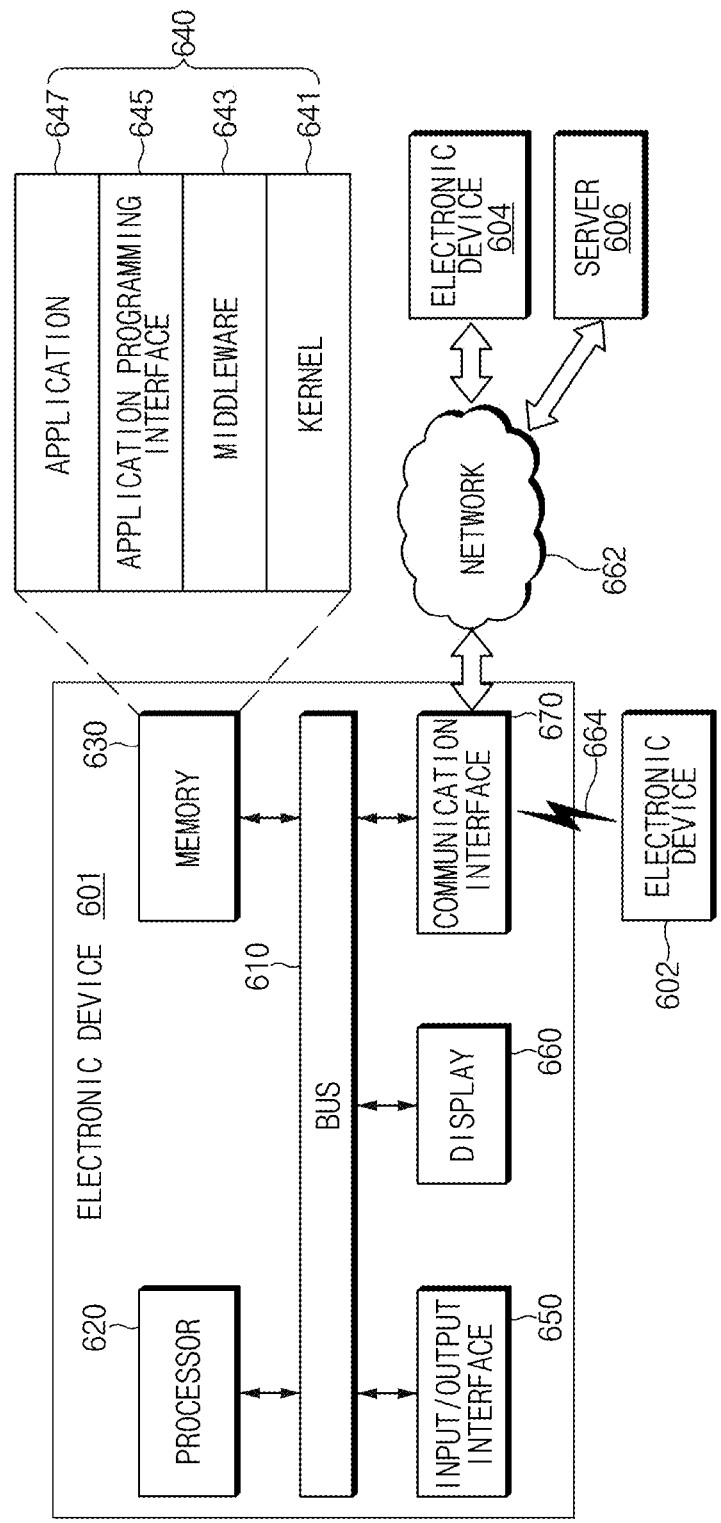
FIG. 6 illustrates an electronic device in a network environment according to various embodiments.

FIG. 6 illustrates an electronic device in a network environment, according to various embodiments.

Referring to the non-limiting example of FIG. 6, according to various embodiments, an electronic device 601, a first electronic device 602, a second electronic device 604, or a server 606 may be connected with each other over a network 662 or local wireless communication 664. The electronic device 601 may include a bus 610, a processor 620, a memory 630, an input/output interface 650, a display 660, and a communication interface 670. According to an embodiment, the electronic device 601 may not include at least one of the above-described elements or may further include other element(s).

According to the non-limiting example of FIG. 6, the bus 610 may interconnect the above-described elements 610 to 670 and may include a circuit for conveying communications (e.g., a control message and/or data) among the above-described elements.

According to certain embodiments, processor 620 may include one or more of a central processing unit (CPU), an application processor (AP), or a communication processor (CP). For example, the processor 620 may perform an arithmetic operation or data processing associated with control and/or communication of at least other elements of the electronic device 601.

The memory 630 may, according to certain embodiments, include a volatile and/or nonvolatile memory. For example, the memory 630 may store instructions or data associated with at least one other element(s) of the electronic device 601. According to an embodiment, the memory 630 may store software and/or a program 640. The program 640 may include, for example, a kernel 641, a middleware 643, an application programming interface (API) 645, and/or an application program (or "an application") 647. At least a part of the kernel 641, the middleware 643, or the API 645 may be referred to as an "operating system (OS)".

For example, the kernel 641 may control or manage system resources (e.g., the bus 610, the processor 620, the memory 630, and the like) that are used to execute operations or functions of other programs (e.g., the middleware 643, the API 645, and the application program 647). Furthermore, the kernel 641 may provide an interface that allows the middleware 643, the API 645, or the application program 647 to access discrete elements of the electronic device 601 so as to control or manage system resources.

The middleware 643 may perform, for example, a mediation role such that the API 645 or the application program 647 communicates with the kernel 641 to exchange data.

Furthermore, the middleware 643 may process one or more task requests received from the application program 647 according to a priority. For example, the middleware 643 may assign the priority, which makes it possible to use a system resource (e.g., the bus 610, the processor 620, the memory 630, or the like) of the electronic device 601, to at least one of the application program 647. For example, the middleware 643 may process the one or more task requests according to the priority assigned to the at least one, which makes it possible to perform scheduling or load balancing on the one or more task requests.

The API 645 may be, for example, an interface through which the application program 647 controls a function provided by the kernel 641 or the middleware 643, and may include, for example, at least one interface or function (e.g., an instruction) for a file control, a window control, image processing, a character control, or the like.

The input/output interface 650 may play a role, for example, an interface which transmits an instruction or data input from a user or another external device, to other element(s) of the electronic device 601. Furthermore, the input/output interface 650 may output an instruction or data, received from other element(s) of the electronic device 601, to a user or another external device.

The display 660 may include, for example, a liquid crystal display (LCD), a light-emitting diode (LED) display, an organic LED (OLED) display, a microelectromechanical systems (MEMS) display, or an electronic paper display. The display 660 may display, for example, various contents (e.g., a text, an image, a video, an icon, a symbol, and the like) to a user. The display 660 may include a touch screen and may receive, for example, a touch, gesture, proximity, or hovering input using an electronic pen or a part of a user's body.

For example, the communication interface 670 may establish communication between the electronic device 601 and an external device (e.g., the first electronic device 602, the second electronic device 604, or the server 606). For example, the communication interface 670 may be connected to the network 662 over wireless communication or wired communication to communicate with the external device (e.g., the second electronic device 604 or the server 606).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 664. The local wireless communication 664 may include at least one of wireless fidelity (Wi-Fi), light fidelity (LiFi), Bluetooth, near field communication (NFC), magnetic stripe transmission (MST), a global navigation satellite system (GNSS), or the like.

The MST may, according to some embodiments, generate a pulse in response to transmission data using an electromagnetic signal, and the pulse may generate a magnetic field signal. The electronic device 601 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 662 may include at least one of telecommunications networks, for example, a computer network (e.g., LAN or WAN), an Internet, or a telephone network.

According to certain embodiments, each of the first and second electronic devices 602 and 604 may be a device of which the type is different from or the same as that of the electronic device 601. According to at least one embodiment, the server 606 may include a group of one or more servers. According to various embodiments, all or a portion of operations that the electronic device 601 will perform may be executed by another or plural electronic devices (e.g., the first electronic device 602, the second electronic device 604 or the server 606). According to an embodiment, in the case where the electronic device 601 executes any function or service automatically or in response to a request, the electronic device 601 may not perform the function or the service internally, but, alternatively additionally, it may request at least a portion of a function associated with the electronic device 601 at other electronic device (e.g., the electronic device 602 or 604 or the server 606). The other electronic device may execute the requested function or additional function and may transmit the execution result to the electronic device 601. The electronic device 601 may provide the requested function or service using the received result or may additionally process the received result to provide the requested function or service. To this end, for example, cloud computing, distributed computing, or client-server computing may be used.

Figure 7:
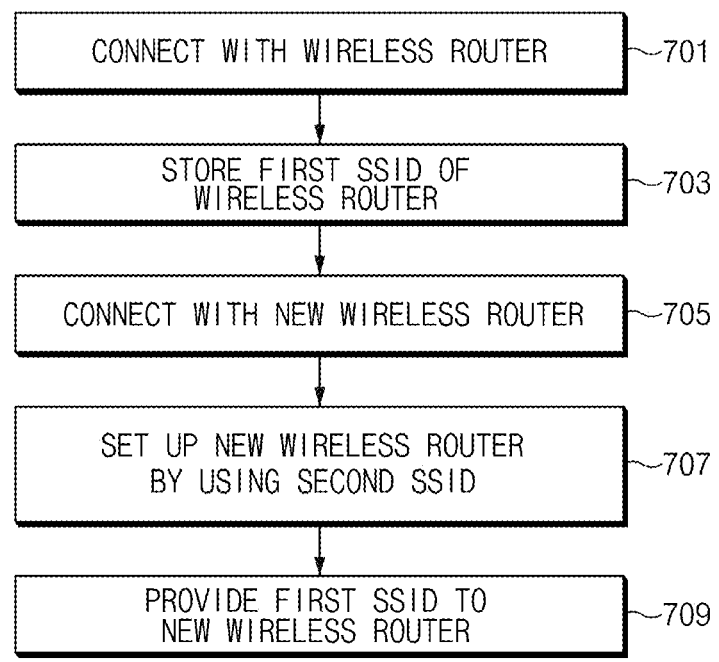
FIG. 7 illustrates in flowchart format, operations of a method in which a configuration device according to certain embodiments sets up a wireless router.

FIG. 7 illustrates in flowchart format, operations of a method in which a configuration device according to certain embodiments of the present disclosure sets up a wireless router.

The configuration device 200 according to at least one embodiment may include all or at least a part of components of the electronic device 601 of FIG. 6.

A configuration of a wireless router or a change of the configuration may be performed through any other electronic device connected with the wireless router. For convenience of description, the other electronic device refers to the configuration device 200. The configuration device 200 according to some embodiments may be an electronic device that is directly connected with the wireless router through wired or wireless communication or may be an electronic device registered at the wireless router. According to other embodiments, the configuration device 200 may be an electronic device that passes an authentication procedure with the wireless router. For example, the configuration device 200 may be an electronic device that connects to the wireless router with specified ID (e.g., SSID) and password. According to certain embodiments, the configuration device 200 may be an electronic device registered at an account server or a cloud server with an account that is the same as or associated with the wireless router. As a non-limiting example, the configuration device 200 may be a notebook, a PC, a smartphone, a tablet, or the like.

Referring to the non-limiting example of FIG. 7, in operation 701, the configuration device 200 may be connected with the wireless router 10 through a communication interface (e.g., the interface 670 of FIG. 6). The wireless router 10 may correspond to a wireless router that broadcasts the first SSID.

In operation 703, the configuration device 200 may store the first SSID of the wireless router 10 in a memory (e.g., the memory 630 of FIG. 6).

According to some embodiments, at operation 705, the configuration device 200 may be connected with the new wireless router 100 through the communication interface 670. In an embodiment, the configuration device 200 may establish connection with the new wireless router 100 for the purpose of setting up a new wireless router. The connection may comply with the wireless communication protocol such as Zigbee, Bluetooth low energy (BLE), or Wi-Fi.

In operation 707, a processor (e.g., the processor 620 of FIG. 6) of the configuration device 200 may set up the new wireless router 100 by using the second SSID. In an embodiment, the second SSID may be generated automatically. For example, the new wireless router 100 may provide the second SSID thereof to the configuration device 200 directly or through a server or account information. Alternatively, the configuration device 200 may directly generate an appropriate second SSID.

In some embodiments, the processor of the configuration device 200 may set up the new wireless router 100 by using the second SSID provided by a user through a display (e.g., the display 660 of FIG. 6) of the configuration device 200. For example, if a wireless router setup application stored in the memory is executed, the processor of the configuration device 200 may allow a UI for receiving an SSID to be provided in the display. If an appropriate SSID is input from the user through the UI, the processor of the configuration device 200 may use the input SSID as the second SSID.

In the non-limiting example of FIG. 7, at operation 709, the configuration device 200 may provide the first SSID being the SSID of the wireless router 10 to the new wireless router 100 such that external devices (e.g., the peripheral device 300) that were connected with the wireless router 10 are connected with the new wireless router 100.

Below, various methods in which the configuration device 200 provides the first SSID to the new wireless router 100 will be described with reference to the non-limiting examples shown in FIGS. 8 and 9.

Figure 8:
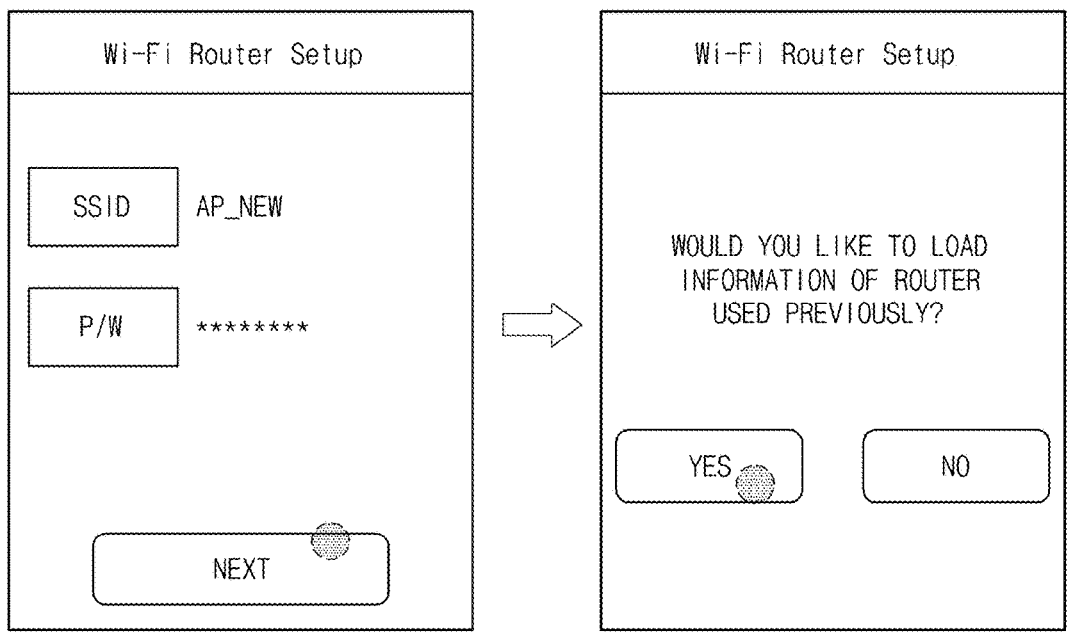
FIG. 8 illustrates an exemplary screen for loading information of a previous wireless router at the configuration device according to some embodiments.

FIG. 8 illustrates an exemplary screen for loading information of a previous wireless router at a configuration device according to some embodiments.

A user may determine whether to use information of the previously used wireless router 10 for the purpose of setting up the new wireless router 100 through a user interface that a setup application installed in the configuration device 200 provides. A non-limiting example of application UI of the configuration device 200 is provided in FIG. 8, and the application UI may be replaced with an interface that is provided in the configuration device 200, such as a PC, through a server or a web site associated with the new wireless router 100.

As shown in a left screen of FIG. 8, the configuration device 200 may provide a UI of an application to allow the user to enter an SSID and a password of the new wireless router 100. For example, "AP_NEW" may be entered as the SSID of the new wireless router 100, and appropriate eight characters/numbers may be entered as the password of the new wireless router 100. If a NEXT button is selected, as shown in a right screen of FIG. 8, the configuration device 200 may display a UI for loading the information of the wireless router 10 in a display of the configuration device 200. In response to agreement of the user (e.g., an input event associated with a YES button), the configuration device 200 may provide at least a part of information on the previously used wireless router 10 or may provide a UI for receiving information on the wireless router 10. If the user does not agree (e.g., an input event associated with a NO button), the configuration device 200 may configure only basic settings associated with the new wireless router 100 and may terminate the application.

Figure 9:
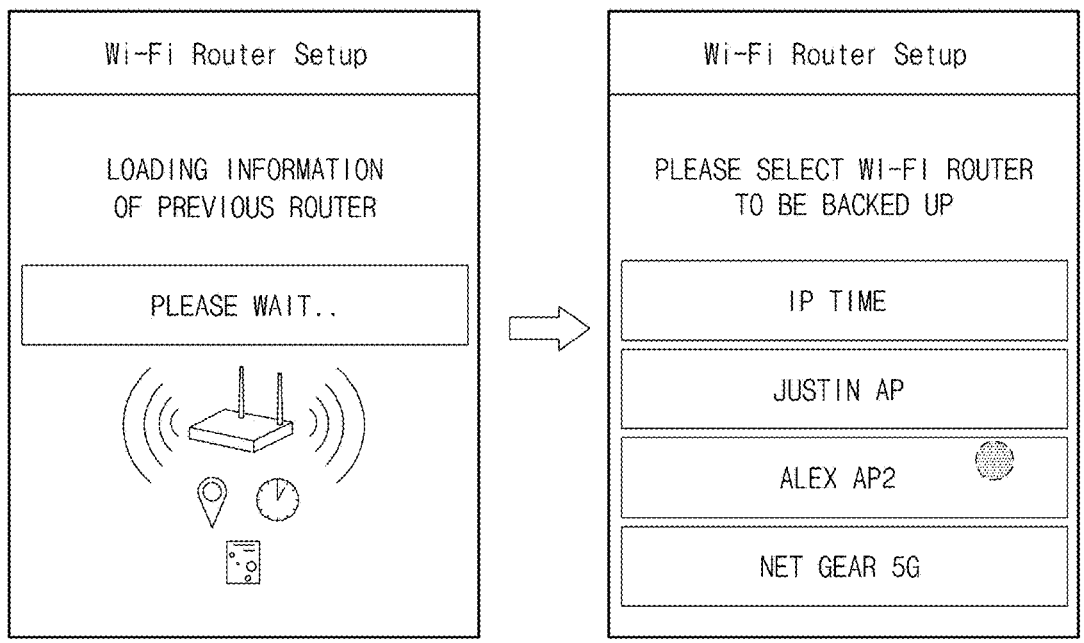
FIG. 9 illustrates an exemplary screen for loading information of the previous wireless router, according to certain embodiments of this disclosure.

FIG. 9 illustrates an exemplary screen for setup that allows a configuration device according to certain embodiments of the present disclosure, to provide information of a previous wireless router.

As described above with reference to FIG. 8, the configuration device 200 may receive information of the wireless router 10 from a user. However, in various embodiments, the configuration device 200 may recommend an appropriate wireless router 10 based on various situation and history information.

According to at least one embodiment, a setup application installed in the configuration device 200 may provide at least a part of information on the wireless router 10 based on current location information of the configuration device 200 and a connection history of a wireless router used in the past. For example, the configuration device 200 may filter information of a wireless router, which a user used in the past in the vicinity of a current location, in a wireless router connection history by using the current location information and may recommend a wireless router based on the filtering result. For example, the configuration device 200 may recommend four wireless routers having a connection history with the configuration device 200 at a current location (e.g., a home) among ten wireless routers corresponding to various locations (e.g., a home, an office, a public place, and the like) included in the connection history. If the number of wireless routers having a connection history with the configuration device 200 at the current location is "1", the configuration device 200 may skip a UI to recommend a wireless router as shown in a right screen of FIG. 9 and may automatically provide at least a part of information on the corresponding wireless router to the new wireless router 100.

According to at least one embodiment, the setup application installed in the configuration device 200 may provide at least a part of information on the wireless router 10 based on a time to connect to a wireless router and a history of times to connect to a wireless router used in the part, instead of location information of the configuration device 200. For example, the configuration device 200 may recommend wireless routers, which were mainly connected with the configuration device 200, as the wireless router 10 at a time when the configuration device 200 attempts to set up a new router.

According to some embodiments, the application may compare a list of previously scanned wireless routers and a list of currently scanned wireless routers to recommend one or more wireless routers as the wireless router 10. For example, in the case where four wireless routers are previously found and three wireless routers are currently found, the configuration device 200 may recommend one wireless router that is not found any more as the wireless router 10. As in another embodiment described above, in the case where the number of wireless routers not found is "1", the configuration device 200 may automatically provide at least a part of information on the wireless router to the new wireless router 100.

Various embodiments described above may be used independently of each of each other, but two or more embodiments may be used in conjunction with one another. By way of a non-limiting example, when the wireless router 10 was used, in the case where there is repeated a pattern in which a time when the wireless router 10 is connected with the configuration device 200 may be approximately 7 PM, a time when connection is discontinued is approximately 8 AM, and a time when connection is maintained is approximately 11 hours, the wireless router 10 may be estimated as a wireless router that was used at home. Also, in the case where wireless routers "A", "B", and "C" found together with the wireless router 10 at the same time exist, if the wireless router 10 is not found suddenly at 8 PM but the wireless routers "A", "B", and "C" are consistently found, the configuration device 200 may determine that connection with the wireless router 10 is discontinued. Depending on the determination result, the configuration device 200 may recommend the wireless router 10 as a wireless router that was connected previously.

Figure 10:
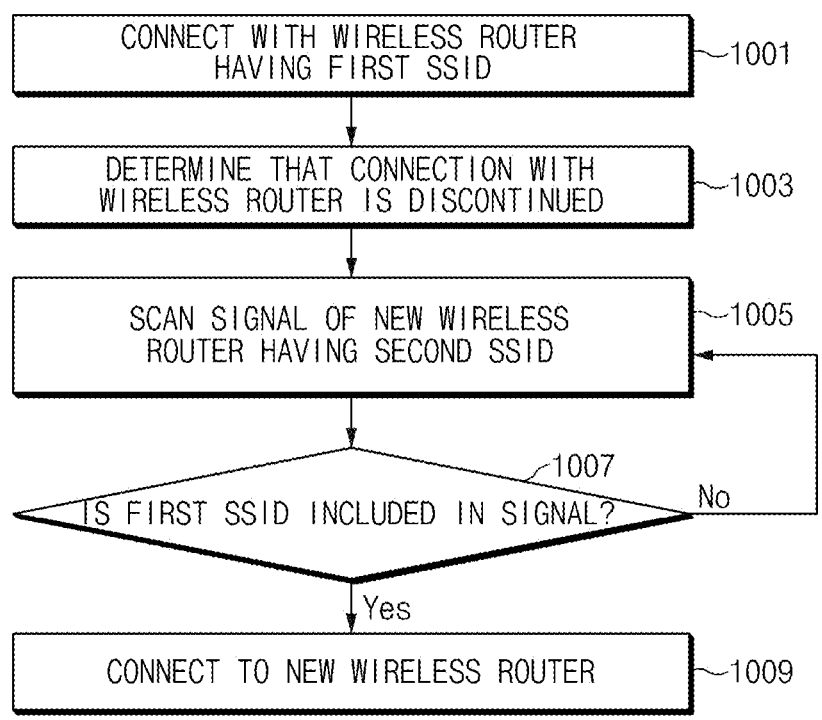
FIG. 10 illustrates, in flowchart format, operations of a method in which a peripheral device according to some embodiments of this disclosure connects to a new wireless router.

FIG. 10 illustrates, in flowchart format, operations of a method in which a peripheral device according to certain embodiments connects to a new wireless router.

Referring to the non-limiting example of FIG. 10, in operation 1001, the peripheral device 300 may be connected with the wireless router 10 including a first SSID. In operation 1003, the peripheral device 300 (e.g., at least one processor included in the peripheral device 300) may determine that the connection with the wireless router 10 is discontinued. In this state, the peripheral device 300 may store information on the first SSID in a memory.

In the non-limiting example of FIG. 10, at operation 1005, the peripheral device 300 (e.g., at least one processor included in the peripheral device 300) may scan a signal of a new wireless router. The scanning operation may be performed periodically. Also, as described above with reference to FIG. 9, as in the operation of the configuration device 200, the scanning operation may be performed by using at least a part of a connection place, a connection time, a connection duration, a connection end time, or information of a surrounding wireless router.

For example, the peripheral device 300 (e.g., at least one processor included in the peripheral device 300) may scan a beacon signal that is broadcast from the new wireless router 100 having a second SSID. The beacon signal may correspond to, for example, the beacon frame 500 described with reference to FIG. 5. For example, the beacon signal may include a header and a frame body including the second SSID and an information element.

According to certain embodiments, at operation 1007, the peripheral device 300 (e.g., at least one processor included in the peripheral device 300) may determine whether the first SSID of the wireless router 10 is included in the signal. For example, the peripheral device 300 may determine whether the first SSID is included in the information element (e.g., VSIE) of the beacon signal.

If it is determined that the first SSID is included in the signal from the new wireless router 100, in operation 1009, the peripheral device 300 (e.g., at least one processor included in the peripheral device 300) may attempt to wirelessly connect to the new wireless router 100 by using a wireless communication circuit of the peripheral device 300. For example, the peripheral device 300 may establish wireless connection with the new wireless router 100 through exchange of a probe request, a probe response message, and the like. If the first SSID is not included in the signal from the new wireless router 100, the peripheral device 300 may consistently scan a connectable wireless router or may enter an SSID and a password of the new wireless router 100 depending on a conventional way to establish connection with the new wireless router 100.

If it succeeds in connecting to the new wireless router 100, the peripheral device 300 (e.g., at least one processor included in the peripheral device 300) may delete or update information of the wireless router 10 so as to immediately connect to the new wireless router 100. Through the deletion or updating, it may be possible to skip an operation of verifying information of the VSIE area all the time upon connecting to a wireless router.

Figure 11:
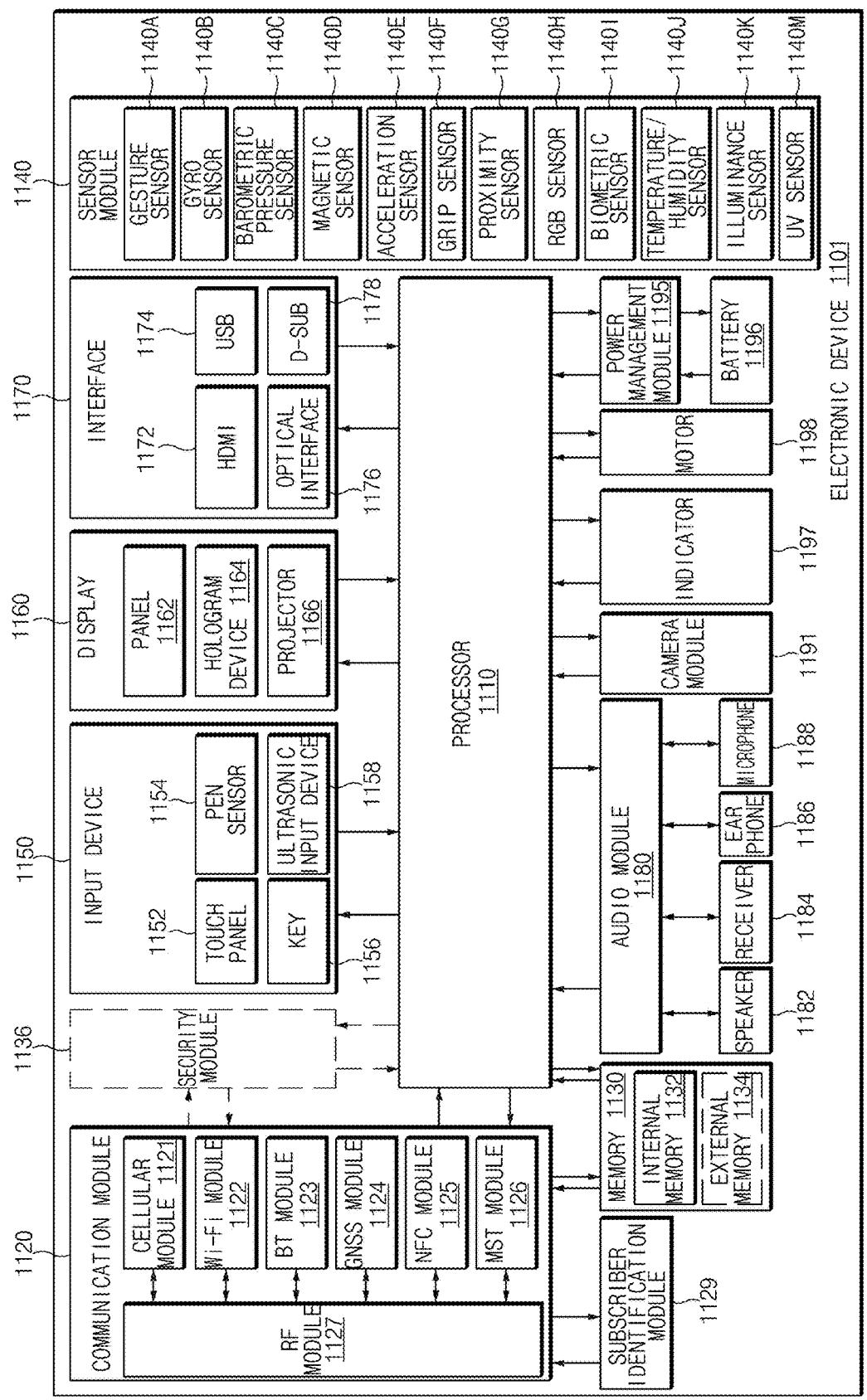
FIG. 11 illustrates a block diagram of the electronic device according to various embodiments.
Figure 12:
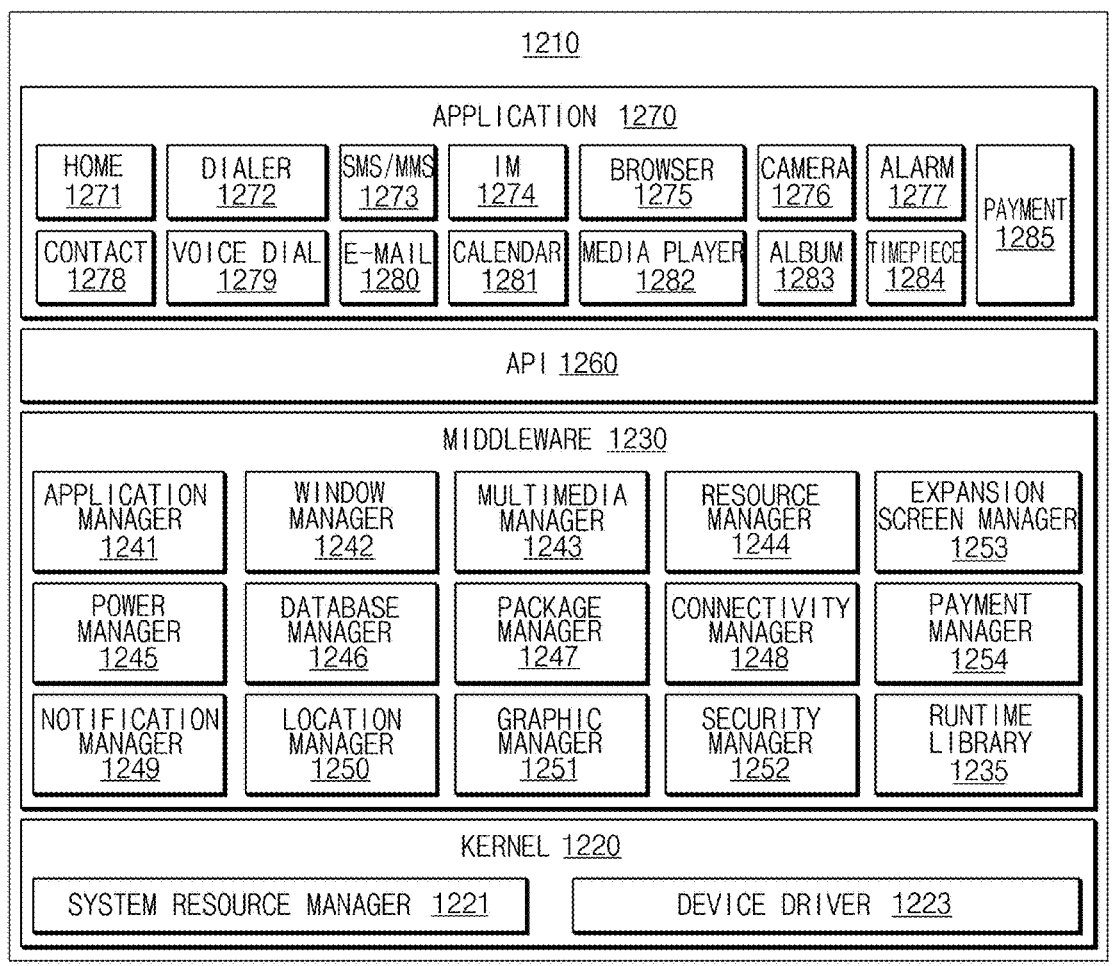
FIG. 12 illustrates, in block diagram format, a program module according to various embodiments of this disclosure.

FIGS. 11 and 12 illustrate, in block diagram format, an electronic device and a program module according to certain embodiments of this disclosure. One skilled in the art may apply/expand configurations and functions of the wireless router 100, the configuration device 200, and the peripheral device 300 described above within the scope well known to the skilled one by using hardware/software modules to be described with reference to FIGS. 11 and 12.

FIG. 11 illustrates, in block diagram format an electronic device, according to various embodiments.

Referring to the non-limiting example of FIG. 11, an electronic device 1101 may include, for example, all or a part of the electronic device 601 illustrated in FIG. 6. The electronic device 1101 may include one or more processors (e.g., an application processor (AP)) 1110, a communication module 1120, a subscriber identification module 1129, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may drive, for example, an operating system (OS) or an application to control a plurality of hardware or software elements connected to the processor 1110 and may process and compute a variety of data. For example, the processor 1110 may be implemented with a System on Chip (SoC). According to an embodiment, the processor 1110 may further include a graphic processing unit (GPU) and/or an image signal processor. The processor 1110 may include at least a part (e.g., a cellular module 1121) of elements illustrated in FIG. 11. The processor 1110 may load an instruction or data, which is received from at least one of other elements (e.g., a nonvolatile memory), into a volatile memory and process the loaded instruction or data. The processor 1110 may store a variety of data in the nonvolatile memory.

According to some embodiments, communication module 1120 may be configured the same as or similar to the communication interface 670 of FIG. 6. The communication module 1120 may include the cellular module 1121, a Wi-Fi module 1122, a Bluetooth (BT) module 1123, a GNSS module 1124 (e.g., a GPS module, a Glonass module, a Beidou module, or a Galileo module), a near field communication (NFC) module 1125, a MST module 1126 and a radio frequency (RF) module 1127.

According to certain embodiments, cellular module 1121 may provide, for example, voice communication, video communication, a character service, an Internet service, or the like over a communication network. According to at least one embodiment, the cellular module 1121 may perform discrimination and authentication of the electronic device 1101 within a communication network by using the subscriber identification module (e.g., a SIM card) 1129. According to an embodiment, the cellular module 1121 may perform at least a portion of functions that the processor 1110 provides. According to some embodiments, the cellular module 1121 may include a communication processor (CP).

Each of the Wi-Fi module 1122, the BT module 1123, the GNSS module 1124, the NFC module 1125, or the MST module 1126 may include a processor for processing data exchanged through a corresponding module, for example. According to some embodiments, at least a part (e.g., two or more) of the cellular module 1121, the Wi-Fi module 1122, the BT module 1123, the GNSS module 1124, the NFC module 1125, or the MST module 1126 may be included within one Integrated Circuit (IC) or an IC package.

For example, the RF module 1127 may transmit and receive a communication signal (e.g., an RF signal). For example, the RF module 1127 may include a transceiver, a power amplifier module (PAM), a frequency filter, a low noise amplifier (LNA), an antenna, or the like. According to another embodiment, at least one of the cellular module 1121, the Wi-Fi module 1122, the BT module 1123, the GNSS module 1124, the NFC module 1125, or the MST module 1126 may transmit and receive an RF signal through a separate RF module.

The subscriber identification module 1129 may include, for example, a card and/or embedded SIM that includes a subscriber identification module and may include unique identify information (e.g., integrated circuit card identifier (ICCID)) or subscriber information (e.g., international mobile subscriber identity (IMSI)).

In the non-limiting example of FIG. 11, memory 1130 (e.g., the memory 630) may include an internal memory 1132 or an external memory 1134. For example, the internal memory 1132 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1134 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1134 may be operatively and/or physically connected to the electronic device 1101 through various interfaces.

According to certain embodiments, a security module 1136 may be a module that includes a storage space of which a security level is higher than that of the memory 1130 and may be a circuit that guarantees safe data storage and a protected execution environment. The security module 1136 may be implemented with a separate circuit and may include a separate processor. For example, the security module 1136 may be in a smart chip or a secure digital (SD) card, which is removable, or may include an embedded secure element (eSE) embedded in a fixed chip of the electronic device 1101. Furthermore, the security module 1136 may operate based on an operating system (OS) that is different from the OS of the electronic device 1101. For example, the security module 1136 may operate based on java card open platform (JCOP) OS.

The sensor module 1140 may, in some embodiments, measure, for example, a physical quantity or may detect an operation state of the electronic device 1101. The sensor module 1140 may convert the measured or detected information to an electric signal. For example, the sensor module 1140 may include at least one of a gesture sensor 1140A, a gyro sensor 1140B, a barometric pressure sensor 1140C, a magnetic sensor 1140D, an acceleration sensor 1140E, a grip sensor 1140F, the proximity sensor 1140G, a color sensor 1140H (e.g., red, green, blue (RGB) sensor), a biometric sensor 1140I, a temperature/humidity sensor 1140J, an illuminance sensor 1140K, or an UV sensor 1140M. Although not illustrated, additionally or generally, the sensor module 1140 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling at least one or more sensors included therein. According to an embodiment, the electronic device 1101 may further include a processor that is a part of the processor 1110 or independent of the processor 1110 and is configured to control the sensor module 1140. The processor may control the sensor module 1140 while the processor 1110 remains at a sleep state.

According to some embodiments, input device 1150 may include, for example, a touch panel 1152, a (digital) pen sensor 1154, a key 1156, or an ultrasonic input unit 1158. For example, the touch panel 1152 may use at least one of capacitive, resistive, infrared and ultrasonic detecting methods. Also, the touch panel 1152 may further include a control circuit. The touch panel 1152 may further include a tactile layer to provide a tactile reaction to a user.

The (digital) pen sensor 1154 may be, for example, a part of a touch panel or may include an additional sheet for recognition. The key 1156 may include, for example, a physical button, an optical key, or a keypad. The ultrasonic input device 1158 may detect (or sense) an ultrasonic signal, which is generated from an input device, through a microphone (e.g., a microphone 1188) and may check data corresponding to the detected ultrasonic signal.

The display 1160 (e.g., the display 660) may include a panel 1162, a hologram device 1164, or a projector 1166. The panel 1162 may be the same as or similar to the display 660 illustrated in FIG. 6. The panel 1162 may be implemented, for example, to be flexible, transparent or wearable. The panel 1162 and the touch panel 1152 may be integrated into a single module. The hologram device 1164 may display a stereoscopic image in a space using a light interference phenomenon. The projector 1166 may project light onto a screen so as to display an image. For example, the screen may be arranged in the inside or the outside of the electronic device 1101. According to an embodiment, the display 1160 may further include a control circuit for controlling the panel 1162, the hologram device 1164, or the projector 1166.

According to certain embodiments, interface 1170 may include, for example, a high-definition multimedia interface (HDMI) 1172, a universal serial bus (USB) 1174, an optical interface 1176, or a D-subminiature (D-sub) 1178. The interface 1170 may be included, for example, in the communication interface 670 illustrated in FIG. 6. Additionally or generally, the interface 1170 may include, for example, a mobile high definition link (MHL) interface, a SD card/multi-media card (MMC) interface, or an infrared data association (IrDA) standard interface.

The audio module 1180 may convert a sound to an electric signal, and conversely, an electrical signal to a sound. At least a part of the audio module 1180 may be included, for example, in the input/output interface 650 illustrated in FIG. 6. The audio module 1180 may process, for example, sound information that is input or output through a speaker 1182, a receiver 1184, an earphone 1186, or the microphone 1188.

For example, the camera module 1191 may shoot a still image or a video. According to an embodiment, the camera module 1191 may include at least one or more image sensors (e.g., a front sensor or a rear sensor), a lens, an image signal processor (ISP), or a flash (e.g., an LED or a xenon lamp).

According to certain embodiments, power management module 1195 may manage, for example, power of the electronic device 1101. According to some embodiments, a power management integrated circuit (PMIC), a charger IC, or a battery or fuel gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1196 and a voltage, current or temperature thereof while the battery is charged. The battery 1196 may include, for example, a rechargeable battery and/or a solar battery.

The indicator 1197 may display a specific state of the electronic device 1101 or a part thereof (e.g., the processor 1110), such as a booting state, a message state, a charging state, and the like. The motor 1198 may convert an electrical signal into a mechanical vibration and may generate the following effects: vibration, haptic, and the like. Although not illustrated, a processing device (e.g., a GPU) for supporting a mobile TV may be included in the electronic device 1101. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

FIG. 12 illustrates in block diagram format, a program module, according to various embodiments of this disclosure.

According to at least one embodiment, a program module 1210 (e.g., the program 140) may include an operating system (OS) to control resources associated with an electronic device (e.g., the electronic device 601), and/or diverse applications (e.g., the application program 647) driven on the OS. The OS may be, for example, Android, iOS, Windows, Symbian, or Tizen.

The program module 1210 may include a kernel 1220, a middleware 1230, an application programming interface (API) 1260, and/or an application 1270. At least a portion of the program module 1210 may be preloaded on an electronic device or may be downloadable from an external electronic device (e.g., the first electronic device 602, the second electronic device 604, the server 606, or the like).

In the non-limiting example of FIG. 12, kernel 1220 (e.g., the kernel 641) may include, for example, a system resource manager 1221 or a device driver 1223. The system resource manager 1221 may control, allocate, or retrieve system resources. According to an embodiment, the system resource manager 1221 may include a process managing unit, a memory managing unit, a file system managing unit, or the like. The device driver 1223 may include, for example, a display driver, a camera driver, a Bluetooth driver, a shared memory driver, a USB driver, a keypad driver, a Wi-Fi driver, an audio driver, or an inter-process communication (IPC) driver.

The middleware 1230 may provide, for example, a function that the application 1270 needs in common, or may provide diverse functions to the application 1270 through the API 1260 to allow the application 1270 to efficiently use limited system resources of the electronic device. According to an embodiment, the middleware 1230 (e.g., the middleware 643) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252, an expansion screen manager 1253, or a payment manager 1254.

According to certain embodiments, runtime library 1235 may include, for example, a library module that is used by a compiler to add a new function through a programming language while the application 1270 is being executed. The runtime library 1235 may perform input/output management, memory management, or capacities about arithmetic functions.

The application manager 1241 may manage, for example, a life cycle of at least one application of the application 1270. The window manager 1242 may manage a graphic user interface (GUI) resource that is used in a screen. The multimedia manager 1243 may identify a format necessary for playing diverse media files, and may perform encoding or decoding of media files by using a codec suitable for the format. The resource manager 1244 may manage resources such as a storage space, memory, or source code of at least one application of the application 1270.

In some embodiments, power manager 1245 may operate, for example, with a basic input/output system (BIOS) to manage a battery capacity, temperature, or power, and may determine or provide power information for an operation of an electronic device by using the corresponding information. The database manager 1246 may generate, search for, or modify database that is to be used in at least one application of the application 1270. The package manager 1247 may install or update an application that is distributed in the form of package file.

The connectivity manager 1248 may manage, for example, wireless connection such as Wi-Fi or Bluetooth. The notification manager 1249 may display or notify an event such as arrival message, appointment, or proximity notification in a mode that does not disturb a user. The location manager 1250 may manage location information about an electronic device. The graphic manager 1251 may manage a graphic effect that is provided to a user, or manage a user interface relevant thereto. The security manager 1252 may provide a general security function necessary for system security, user authentication, or the like. The expansion screen manager 1253 may determine, for example, an area of a display where graphics are to be displayed. According to an embodiment, the expansion screen manager 1253 may manage information or graphic effects to be provided through the display area determined such that graphics are to be displayed or a user interface associated therewith.

According to some embodiments, in the case where an electronic device (e.g., the electronic device 601) includes a telephony function, the middleware 1230 may further include a telephony manager for managing a voice or video call function of the electronic device. The middleware 1230 may include a middleware module that combines diverse functions of the above-described elements. The middleware 1230 may provide a module specialized to each OS kind to provide differentiated functions. Additionally, the middleware 1230 may dynamically remove a part of the preexisting elements or may add new elements thereto.

According to certain embodiments, API 1260 (e.g., the API 645) may be, for example, a set of programming functions and may be provided with a configuration that is variable depending on an OS. For example, in the case where an OS is the android or the iOS, it may provide one API set per platform. In the case where an OS is the Tizen, it may provide two or more API sets per platform.

The application 1270 (e.g., the application program 647) may include, for example, one or more applications capable of providing functions for a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, a timepiece 1284, a payment 1285, health care (e.g., measuring an exercise quantity, blood sugar, or the like) or offering of environment information (e.g., information of barometric pressure, humidity, temperature, or the like).

According to some embodiments, the application 1270 may include an application (hereinafter referred to as "information exchanging application" for descriptive convenience) to support information exchange between an electronic device (e.g., the electronic device 601) and an external electronic device (e.g., the first electronic device 602 or the second electronic device 604). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to some embodiments, the application 1270 may include an application (e.g., a health care application of a mobile medical device) that is assigned in accordance with an attribute of an external electronic device. According to at least one embodiment, the application 1270 may include an application that is received from an external electronic device (e.g., the first electronic device 602, the second electronic device 604, or the server 606). According to an embodiment, the application 1270 may include a preloaded application or a third party application that is downloadable from a server. The names of elements of the program module 1210 according to the embodiment may be modifiable depending on kinds of operating systems.

According to various embodiments, at least a portion of the program module 1210 may be implemented by software, firmware, hardware, or a combination of two or more thereof. At least a portion of the program module 1210 may be implemented (e.g., executed), for example, by the processor (e.g., the processor 1110). At least a portion of the program module 1210 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 620), may cause the one or more processors to perform a function corresponding to the instruction. The computer-readable storage media, for example, may be the memory 630.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents. Although the present disclosure has been described with various embodiments, various changes and modifications may be suggested to one skilled in the art. It is intended that the present disclosure encompass such changes and modifications as fall within the scope of the appended claims

What is claimed is:

1. An electronic device comprising:
   a housing;
   a wireless communication circuit positioned inside the housing and configured to support a wireless communication protocol with a coverage of up to approximately 100 meters;
   a wired communication interface positioned inside the housing;
   a processor positioned inside the housing and operatively connected to the wireless communication circuit and the wired communication interface; and
   a memory positioned inside the housing and electrically connected to or integrated with the processor,
   wherein the memory stores instructions that, when executed, cause the processor to:
      connect with an external device by using the wireless communication circuit or the wired communication interface,
      receive first information to set the electronic device as an access point (AP) from the external device,
      receive second information on another AP from the external device,
      configure the electronic device by using the first information, and
      wirelessly broadcast a signal by using the wireless communication circuit, to allow wireless devices to connect to the AP,
      wherein the signal includes:
         a header; and a frame body including:
a service set identifier (SSID) provided based at least partly on the first information, and information provided based at least partly on the second information.

2. The electronic device of claim 1, wherein the wireless communication protocol includes at least one of Bluetooth, ZigBee, wireless highway addressable remote transducer (HART), near field communication (NFC), wireless fidelity (Wi-Fi), and Wi-Fi Direct.

3. The electronic device of claim 1, wherein the wireless communication protocol is a version of Wi-Fi protocol, and wherein the information provided based at least partly on the second information is a vendor specific information element (VSIE) defined by the Wi-Fi protocol.

4. The electronic device of claim 1, wherein the signal further includes a frame check sequence (FCS).

5. The electronic device of claim 1, wherein the second information includes an SSID of the another AP.

6. The electronic device of claim 5, wherein, if the SSID of the another AP exceeds a specified length, the signal includes a part, which corresponds to the specified length, of the SSID of the another AP in the frame body.

7. The electronic device of claim 1, wherein the electronic device is an access point.

8. The electronic device of claim 1, wherein the memory further stores instructions that, when executed, cause the processor to:
receive a probe request using the second information from at least one device of the wireless devices;
transmit a probe response to the at least one device of the wireless devices in response to the received probe request; and
provide a wireless network service with respect to the at least one device of the wireless devices.

9. An electronic device comprising:
a housing;
a wireless communication circuit positioned inside the housing and configured to support a wireless communication protocol with a coverage of up to approximately 100 meters;
a processor positioned inside the housing and operatively connected to the wireless communication circuit; and
a memory positioned inside the housing and electrically connected to or integrated with the processor,
wherein the memory stores instructions that, when executed, cause the processor to:
connect wirelessly with a first access point (AP) including a first service set identifier (SSID) by using the wireless communication circuit,
determine that wireless connection to the first AP is discontinued,
scan a broadcast signal from a second AP,
wherein the broadcast signal includes:
a header; and
a frame body including a second SSID, and information element;
determine that the information element includes the first SSID, and
transmit, to the second AP, a request signal including a probe request frame associated with the first SSID to connect wirelessly with the second AP by using the wireless communication circuit when the information element includes the first SSID.

10. The electronic device of claim 9, wherein the electronic device is any one of an air conditioner, a refrigerator, a washing machine, a television (TV), a personal computer (PC), and a laptop.

11. An electronic device comprising:
a housing;
a touchscreen display exposed through the housing;
a wireless communication circuit positioned inside the housing and configured to support a wireless communication protocol with a coverage of up to approximately 100 meters;
a processor positioned inside the housing and operatively connected to the touchscreen display and the wireless communication circuit; and
a memory positioned inside the housing and electrically connected to the processor,
wherein the memory stores instructions that, when executed, cause the processor to:
connect wirelessly with a first access point (AP) broadcasting a first service set identifier (SSID) by using the wireless communication circuit,
store the first SSID in the memory,
connect wirelessly with a second AP by using the wireless communication circuit,
set up the second AP by using a second SSID that is generated automatically or is provided by a user through the touchscreen display, and
provide the first SSID to the second AP to allow the second AP to connect with external devices previously connected to the first AP using the first SSID.

12. The electronic device of claim 11, wherein the electronic device is configured to:
connect wirelessly with the second AP based on any one wireless communication protocol of Zigbee, BLE, and Wi-Fi.

13. The electronic device of claim 11, wherein the electronic device is configured to:
display a user interface (UI) to provide information of the first AP in the touchscreen display.

14. The electronic device of claim 13, wherein the electronic device is configured to:
if a user input to agree to provide the information of the first AP is provided through the UI, provide the information on the first AP to the second AP.

15. The electronic device of claim 11, wherein the electronic device is configured to:
provide information of the first AP to the second AP based on location information of the electronic device and a connection history of an AP that the electronic device uses in the past.

16. The electronic device of claim 11, wherein the electronic device is configured to:
provide information of the first AP to the second AP based on a connection time of an AP that the electronic device uses in the past.

17. The electronic device of claim 11, wherein the electronic device is configured to:
compare a list of access points that the electronic device scans in the past and a list of currently scanned access points; and
provide information of the first AP to the second AP based on a result of the comparison.

18. The electronic device of claim 17, wherein the electronic device is configured to:
provide information on at least one AP not scanned currently according to the result of the comparison to the second AP as first information.

19. The electronic device of claim 18, wherein the electronic device is configured to:
if the result of the comparison indicates that only the first AP exists as an AP not scanned currently, automatically provide the first information to the second AP.

20. The electronic device of claim 11, wherein the electronic device is a smartphone or a tablet.

* * * * *